United States Patent [19]
Van Cort

[11] Patent Number: 5,379,156
[45] Date of Patent: Jan. 3, 1995

[54] OPTICAL VIEWING DEVICE

[75] Inventor: Lawrence E. Van Cort, Conway, Mass.

[73] Assignee: Van Cort Instruments, Inc., Northampton, Mass.

[21] Appl. No.: 48,805

[22] Filed: Apr. 16, 1993

[51] Int. Cl.6 .................................................. G02B 5/04
[52] U.S. Cl. ..................................... 359/831; 359/834; 359/837
[58] Field of Search ................ 359/367, 877, 834, 887, 359/503, 504, 837, 615, 669, 831

[56] References Cited

U.S. PATENT DOCUMENTS

| 542,804 | 7/1895 | Piaget | 359/669 |
| 999,512 | 8/1911 | Miele | 359/669 |
| 2,375,634 | 5/1945 | Dunning | 359/669 |

*Primary Examiner*—Eugene R. LaRoche
*Assistant Examiner*—Vu A. Le
*Attorney, Agent, or Firm*—Fishman, Dionne & Cantor

[57] ABSTRACT

An optical novelty device comprising a pair of wedge prisms disposed in a container having a viewing port and a light-entry port whereby an image viewed through said device appears as a symmetrical right-side-up refracted image regardless of the orientation of the device

5 Claims, 2 Drawing Sheets

OPTICAL VIEWING DEVICE

BACKGROUND OF THE INVENTION

The present invention relates to an optical novelty device. In particular, it relates to an optical device which employs a pair of wedge prisms disposed in such a manner as to produce a right-side-up refracted image.

Prisms are generally known for their use in optical systems to deflect or deviate a beam of light. In general, it can be stated that a prism is a medium, usually solid, which distorts, slants or colors whatever is viewed through it. It has been found that the positioning of a pair of wedge prisms in a pre-determined configuration will enable a person To view an object through said prisms to create a panoramic viewing illusion.

SUMMARY OF THE INVENTION

Accordingly, it is an object of the present invention to provide an optical novelty device which produces panoramic viewing illusions.

It is another object of the present invention to provide an optical novelty device which is simple to manufacture, yet sturdy.

Other objects and advantages of the present invention will become more apparent when considered in view of the following discussion and the accompanying drawings wherein.

Figure 1:
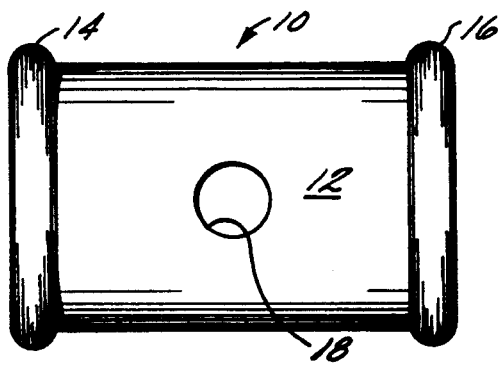
FIG. 1 is a top plan view of the optical novelty device of the present invention.
Figure 2:
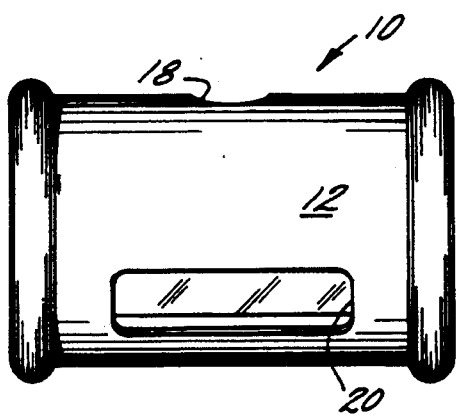
FIG. 2 is the device of FIG. 1 rotated 90 degrees.
Figure 3:
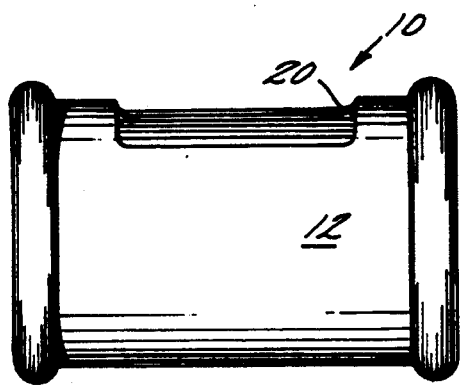
FIG. 3 is the device of FIG. 2 rotated an additional 90 degrees.
Figure 4:
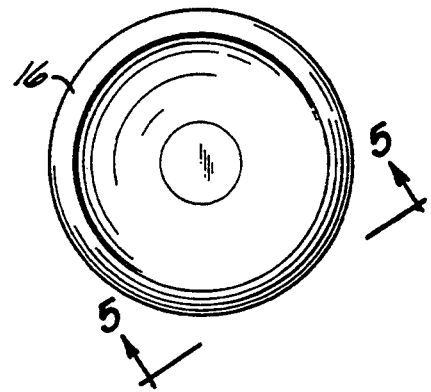
FIG. 4 is an end view of the device of FIG. 1.
Figure 5:
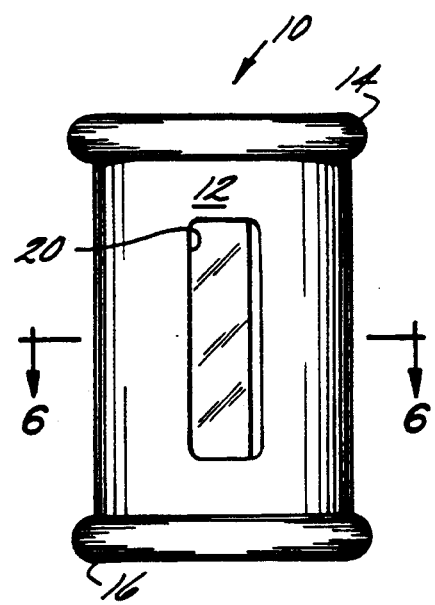
FIG. 5 is a view taken along the line 5—5 of FIG. 4.

As shown in FIGS. 1-5, the optical novelty device of the present invention is depicted at 10. Said device comprises an elongated, thin wall, hollow body 12, which is depicted in cylindrical form, and end caps 14 and 16. The body 12 is provided with a viewing aperture 18 disposed at the approximate mid-point of hollow cylindrical body 12. The hollow cylindrical body 12 is also provided with a light-entry port 20. As shown, the light-entry port 20 is rectangular in shape and is positioned parallel to the longitudinal centerline of the device 10.

Figure 6:
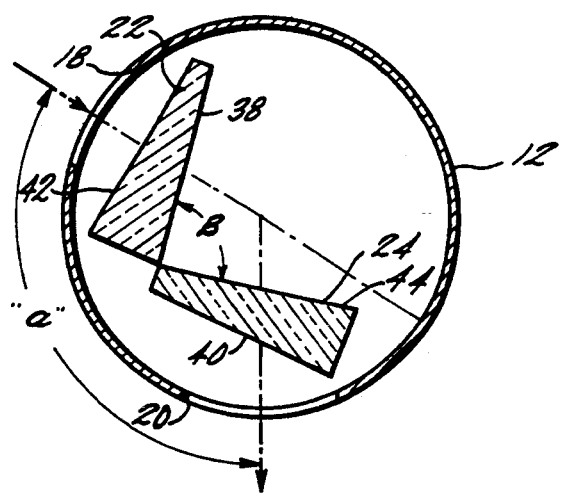
FIG. 6 is a section view taken along the line 6—6 of FIG. 5.

As best seen in FIG. 6, the viewing aperture 18 and the light-entry port are circumferentially offset from one another by an angle "a". Said angle is preferably about 120° to about 125°.

Figure 7:
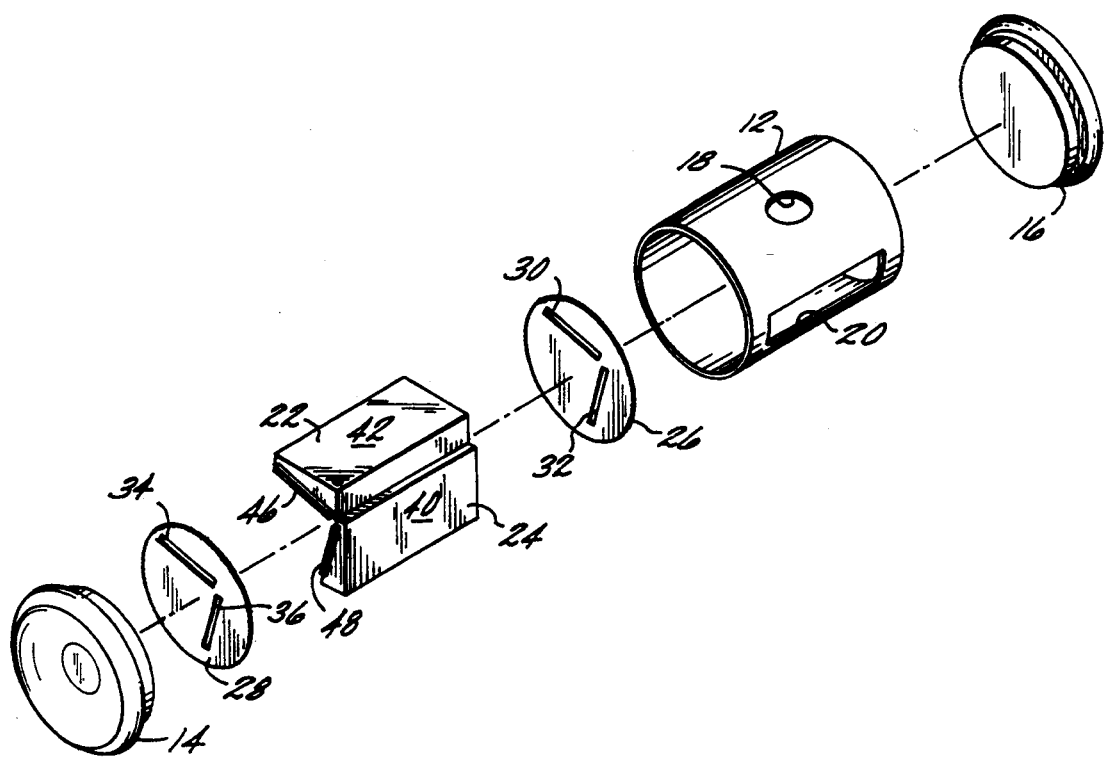
FIG. 7 is an exploded view of the device of FIG. 1.

With reference to FIGS. 6 and 7, it will be seen that the hollow body 12 contains a first prism 22, a second prism 24 and means for holding said prisms in a predetermined angular position relative to one another and relative to the viewing aperture 18 and the light-entry port 20. Said means comprises a pair of alignment discs 26 and 28 disposed at each end of the device 10 inside of end caps 14 and 16 respectively. As shown, each disc 26 and 28 is provided with a pair of alignment slots 30 and 32 and 34 and 36.

The prisms 22 and 24 are generally wedge-shaped and have an entrance face 38 and 40 respectively and an exit face 42 and 44 respectively. As shown, the exit face 44 of prism 24 is disposed at an angle "b" to the entrance face 38 of prism 22. Said angle "b" is from about 79° to about 90° and preferably from about 84° to about 88°. The prisms 22 and 24 are maintained in a predetermined angular relationship by alignment means which is engagable with holding means. Said alignment means includes a tongue 46 disposed on each end of prism 22 and a tongue 48 disposed on each end of prism 24. As shown, the tongues 46 (only 1 shown) associated with prism 22 are disposed in substantially the same plane as the entrance face 38 of prism 22, while the tongues 48 (only 1 shown) are disposed in substantially the same plane as the exit face 44 of prism 24. One of the tongues 46 of prism 22 is engagable with said holding means via slot 34 of disc 28, while the other tongue (not shown) of prism 22 is engagable with said holding means via slot 30 of disc 26. Similarly, one tongue 48 of prism 24 is engagable with slot 36 of disc 28, and the other tongue (not shown) of prism 24 is engagable with slot 32 of disc 26.

Upon engagement of the tongues 46 and 48 with slots 30 and 32 and 34 and 36 of discs 26 and 28, the prism arrangement is disposed in the hollow body 12 in such a manner so that the exit face 42 of prism 22 is perpendicular to the radial centerline of viewing aperture 18. As seen in FIG. 6, such an arrangement causes the entrance face 40 of prism 24 to be somewhat skewed with regard to the radial centerline of viewing port 20. After the prism arrangement is in place in the body 12, the end cads 14 and 16 are glued or otherwise affixed in place.

When the device 10 is fully assembled as noted above, light which enters the viewing port 20 is refracted by prism 24 and then refracted a second time by prism 22. When said double-refracted light is viewed through aperture 18, any included image is seen as a symmetrical right-side-up image regardless of the orientation of the device 10.

While the invention herein has been described by means of a specific construction, it will be clear to those skilled in the art that modifications may be made to said construction without departing from the spirit and scope of the invention.

What is claimed is:

1. An optical viewing device comprising an elongated, thin wall, hollow body, a viewing aperture disposed in said thin wall, a light entry port also disposed in said thin wall, said viewing aperture being circumferentially offset from salad light entry port by an angle of from about 120° to about 125°, a pair of wedge prisms disposed within said hollow body, each of said prisms having an entrance face and an exit face, means for holding said prisms in a predetermined angular relationship relative to each other and to said viewing aperture and said light entry port so that light entering said port is refracted twice before exiting said viewing aperture and end caps disposed at each end of said hollow body.

2. The optical viewing device of claim 1 wherein said holding means includes a pair of alignment discs, each of said discs having a pair of alignment slots therein, said alignment slots being disposed in said predetermined angular relationship, a tongue disposed on each end of each prism, said tongues being engagable with said slots of said alignment discs.

3. The optical viewing device of claim 2 wherein said predetermined angular relationship is from about 79° to about 90°.

4. The optical viewing device of claim 3 wherein said predetermined angular relationship is about 86°.

5. The optical viewing device of claim 2 wherein the exit face of one of said prisms is disposed perpendicular to the centerline of the viewing aperture.

* * * * *